United States Patent [19]
Hintenlang et al.

[11] Patent Number: 5,984,312
[45] Date of Patent: Nov. 16, 1999

[54] SEALING DEVICE

[75] Inventors: Armin Hintenlang, Hirschberg; Klaus Schäfer, Mannheim-Rheinau; Reinhold Kraus, Mörlenbach; Kurt Ewald, Frankenthal; Andreas Jaekel, Weinheim; Rolf Weis, Hemsbach; Erwin Schäfer, Viernheim; Bernd Stichler, Ludwigsburg, all of Germany

[73] Assignee: Firma Carl Freudenberg, Weinheim, Germany

[21] Appl. No.: 08/931,402

[22] Filed: Sep. 15, 1997

[30] Foreign Application Priority Data

Sep. 17, 1996 [DE] Germany .......................... 196 37 814

[51] Int. Cl.$^6$ ..................................... F16J 15/38
[52] U.S. Cl. .......................... 277/371; 277/385; 277/390; 277/391
[58] Field of Search .................................... 277/358, 370, 277/371, 375, 377, 379, 385, 390, 391

[56] References Cited

U.S. PATENT DOCUMENTS

| | | | |
|---|---|---|---|
| 2,440,155 | 4/1948 | Peterson et al. | 277/391 |
| 2,445,018 | 7/1948 | Brady, Jr. | 277/391 |
| 2,447,930 | 8/1948 | Biggs | 277/391 |
| 2,559,963 | 7/1951 | Jensen | 277/391 |
| 4,136,885 | 1/1979 | Uhrner | 277/391 |
| 4,272,084 | 6/1981 | Martinson et al. | 277/390 |
| 5,199,719 | 4/1993 | Heinrich et al. | |

FOREIGN PATENT DOCUMENTS 39 27 589 A1   6/1991   Germany .

*Primary Examiner*—Anthony Knight
*Assistant Examiner*—John L. Beres
*Attorney, Agent, or Firm*—Kenyon & Kenyon

[57] ABSTRACT

A sealing device comprises a slide ring and a counterring having sealing surfaces, the slide ring and counterring contacting one another under axial prestressing in a sealing manner and capable of rotating relative to one another, the counterring and a substantially L-shaped engaging ring being interconnected, the engaging ring being affixed to a shaft to be sealed, and the counterring and the engaging ring being sealed relatively to each other by a sealing ring. The counterring contacts a radial segment of the engaging ring and surrounds an axial segment with radial clearance, and the sealing ring is sealingly arranged, under elastic prestressing, in the gap formed by the clearance. The counterring has an inner peripheral surface which forms an angle α of about 0.5° to about 60° with an axis of rotation, and the radial clearance in which the sealing ring is arranged is greater on the side facing the radial segment of the engaging ring than on the side facing the slide ring.

5 Claims, 1 Drawing Sheet

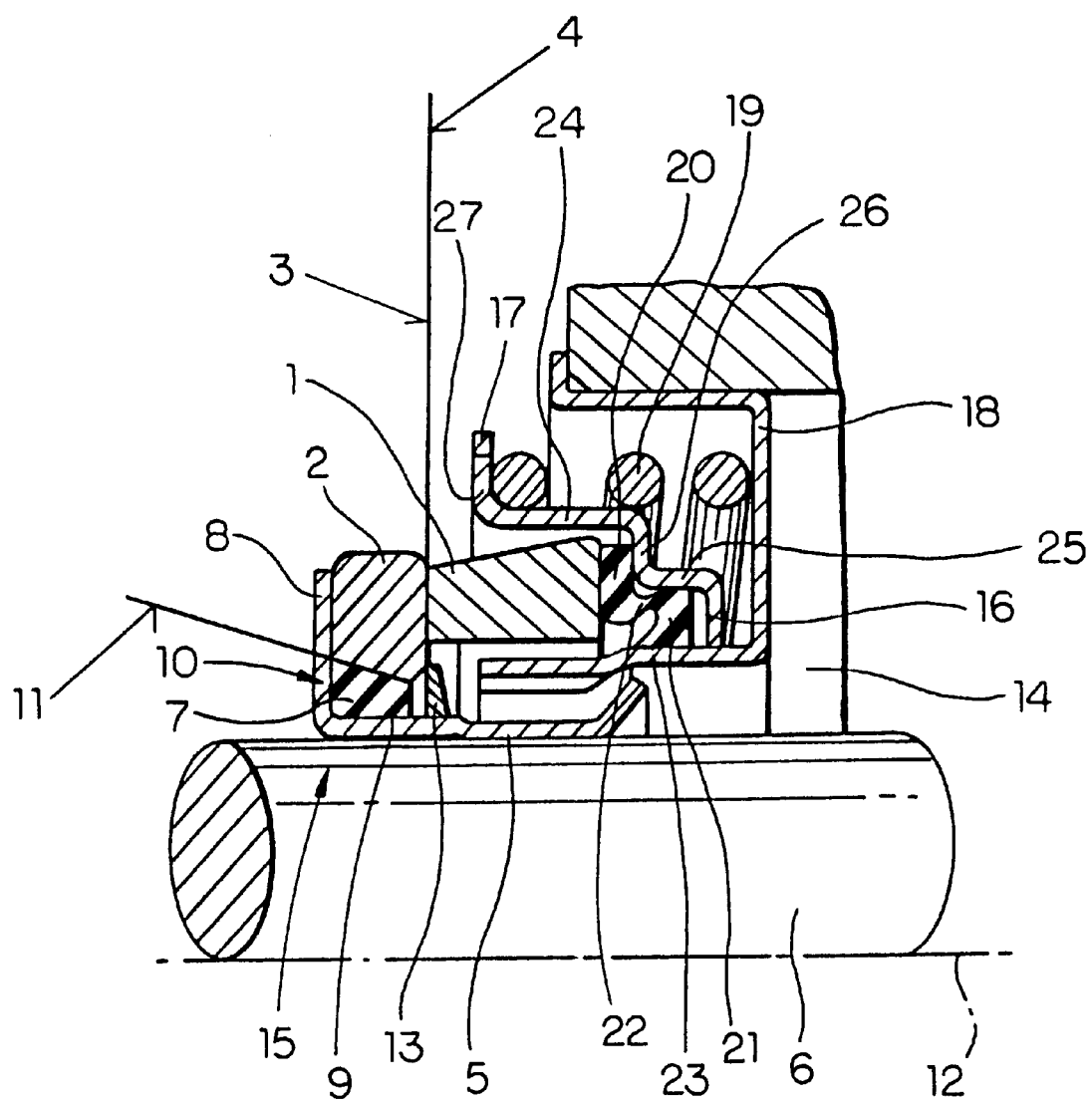

SEALING DEVICE

BACKGROUND OF THE INVENTION

The invention relates to a sealing device comprising a slide ring elastically prestressed against a counterring for sealing, the slide ring and counterring having sliding surfaces allowing relative rotation between the two. The counterring and an essentially L-shaped engaging ring are interconnected, and the engaging ring is relatively immovably affixed to a shaft to be sealed. The counterring and the engaging ring are sealed relative to each other by a sealing ring. The counterring is in direct contact with a radial segment of the engaging ring and surrounds an axial segment of the engaging ring with radial clearance. The sealing ring is sealingly arranged, under elastic prestressing, in the gap formed by the clearance.

Such a slide ring seal is known from German Patent Document 39 27 589 and U.S. Pat. No. 5,199,719. The engaging ring has a C-shaped cross-section open axially in the direction of the slide ring and is configured integrally and continuously with the sealing ring. The sealing ring and the engaging ring are vulcanized to one another, and the sealing ring has a profile adapted to the shape of the engaging ring and completely covering the surface of the engaging ring facing the counterring. The sealing ring seals the engaging ring and the counterring relatively to each other.

SUMMARY OF THE INVENTION

An object of the invention is to develop a sealing device that can be produced more simply and cost effectively and that has a reduced axial length. In accordance with an embodiment of the invention, the counterring is provided with an inner peripheral surface that forms an angle $\alpha$ of 0.5° to 60° with the axis of rotation. The angle opens toward the radial segment of the engaging ring such that the radial distance between the axial segment of the engaging ring and the angled inner peripheral surface of the counterring is greater on the side of the counterring facing the radial segment than on the side facing the slide ring. The angle $\alpha$ may preferably be 5° to 45°. Due to its simple design, a sealing device constructed in such a manner can be produced simply and cost effectively. Preferably, the engaging ring may be made of a non-rusting metallic material and may be shaped without cutting. The sealing ring—interposed between and specific to the engaging ring and the counterring—is produced separately and may be made, for example, of a customary O-ring. Such O-rings are inexpensively available in a multitude of dimensions.

The end faces of the counterring and the sealing ring facing away from the slide ring are arranged in a common radial plane which corresponds to the inner surface of the radial segment of the engaging ring facing the slide ring. The axial dimensions of the sealing device are substantially reduced by such an arrangement. For example, to seal shafts which may have a diameter of approximately 10 mm, the axial length of the sealing device in the unmounted state corresponds to the diameter of the shaft to be sealed.

The counterring cross-section, increasing in radial width toward the slide ring, enables a simple mounting of the counterring on the engaging ring, with the intermediate joining of the sealing ring. The tapered inner peripheral surface of the counterring substantially reduces the danger of damage to the sealing ring during assembly. Another advantage is that the surface pressure of the sealing ring on the side facing the medium to be sealed is greater than on the side of the sealing ring facing away from the medium to be sealed.

The angle $\alpha$ may preferably be 15° to 30°. In this range, a good balance is found between a simple assembling capability of the counterring on the sealing ring on the one hand, and an adequate radial pressing of the sealing ring to seal the medium to be sealed on the other hand.

The counterring is contacted by a thrust ring arranged on the axial segment of the engaging ring, the thrust ring being axially prestressed in the direction of the radial segment of the engaging ring. The counterring, the engaging ring, the sealing ring, and the thrust ring may form a unit. This unit can be preassembled, considerably simplifying the assembly of the entire sealing device and reducing the possibility of assembly errors. The engaging ring and the thrust ring may be made of a tough, non-rusting material, preferably metal.

BRIEF DESCRIPTION OF THE DRAWING

The drawing shows an embodiment of a sealing device in accordance with the invention.

DETAILED DESCRIPTION OF THE DRAWING

The drawing shows an exemplary embodiment of a sealing device according to the invention in schematic representation. Arranged on a shaft 6 to be sealed, that is supported in a space 14 to be sealed, is engaging ring 5 which is L-shaped and is made of a rustproof metallic material. Engaging ring 5 is pressed onto the outer surface of shaft 6. Counterring 2 and sealing ring 7 are arranged in a radial plane on the side facing the radial segment 8 of engaging ring 5, and are in contact with the radial segment 8. Thrust ring 13 is arranged on axial segment 9 of engaging ring 5 and holds together unit 15, which can be preassembled and comprises counterring 2, engaging ring 5, sealing ring 7, and thrust ring 13, in the preassembled state of the sealing device.

Sealing ring 7 is formed by an O-ring which is elastically deformed by the mounting of counterring 2 and assumes the shape shown in the drawing. Inner peripheral surface 11 of the counterring 2 forms an angle $\alpha$ with the axis of rotation 12. The angle in the exemplary embodiment is 20°. The cross-section of the counterring 2 increases in the direction of the slide ring 1.

Sealing surface 3 of slide ring 1, under axial prestressing, abuts in a sealing manner against sealing surface 4 of counterring 2, allowing sliding and relative rotation between the two. Slide ring 1, on the side facing away from sealing surface 3, is sealed relative to a retaining ring 17 by a ring-shaped bellows 16 of elastomeric material. The retaining ring 17 is biased by compression spring 19 away from a housing 18, which has an essentially C-shaped cross-section open in the direction of slide ring 1.

As can be seen in the drawing, the retaining ring 17 comprises a first axial segment 24 and a second axial segment 25 which are connected by a first radial segment 26. The retaining ring 17 also comprises a radially extending flange 27 extending from the first axial segment 24.

The compression spring 19 that biases the retaining ring 17 away from the housing 18 presses against the radially extending flange 27 of the retaining ring 17.

Bellows 16 has an essentially N-shaped cross-section with a first radial segment 20 and a second radial segment 21 that are joined by an axial segment 22. The first radial segment 20 sealingly contacts, under elastic prestressing, the end face of slide ring 1 facing away from sealing surface 3, and the second radial segment 21 sealingly contacts, under elastic prestressing, the inner segment 23 of the housing 18.

The profile of the retaining ring 17 is adapted to the shape of bellows 16. The first radial segment 20 of the ring-shaped bellows 16, axially on the side facing away from slide ring 1, is in contact, under elastic prestressing, with the first radical segment 26 of the retaining ring 17, while avoiding a relative movement encumbered by friction. The second radial segment 21 is in contact radially on the inside with inner segment 23 and radially on the outside with the second axial segment 25 of the retaining ring 17, in each case avoiding a relative movement encumbered by friction.

Because the ring-shaped bellows 16, viewed in cross-section, is essentially N-shaped, and because the sealing ring 7 is arranged radially within the counterring 2, the entire sealing device is very short in the axial direction.

The sealing of the medium to be sealed takes place between the first radial segment 20 and the end face of slide ring 1 facing away from sealing surface 3, as well as between the second radial segment 21 and the inner segment 23 of housing 18. The axial prestressing of first radial segment 20 against slide ring 1 is effected by the prestress applied by compression spring 19 on the retaining ring 17. The radial prestressing of the second radial segment 21 takes place essentially due to the elasticity of the bellows material itself. The radial prestressing is reinforced by the retaining ring 17 which surrounds the second radial segment 21 under radial prestressing. In the event of axial shifts of slide ring 1 relative to housing 18 caused, for example, by thermal expansion, a roll-away movement takes place between the outer peripheral side of second radial segment 21 and the area of retaining ring 17 which is in contact, under prestressing, with second radial segment 21. In this manner, abrasive wear and tear is completely avoided in this area. Bellows 16 is merely subject to a flexing strain which does not disadvantageously affect its service life.

Due to the design and arrangement of the retaining ring 17, bellows 16, and the sealing ring 7 arranged radially within the counterring 2, the entire sealing device has extremely small dimensions in the axial direction. In the exemplary embodiment shown here, both the diameter of the shaft and the axial length of the sealing device may amount to about 12 mm.

What is claimed is:

1. A sealing device comprising a slide ring and a counterring having sealing surfaces, the slide ring and counterring contacting one another under axial prestressing in a sealing manner and capable of rotating relative to one another, the slide ring, on a side facing away from the counterring, being sealed relative to a retaining ring by a ring-shaped bellows of elastomeric material, the retaining ring comprising a first axial segment and a second axial segment which are connected by a first radial segment, and the retaining ring further comprising a radially extending flange extending from the first axial segment wherein a compression spring presses against the radially extending flange of the retaining ring to bias the retaining ring toward the slide ring and away from a housing, wherein the ring-shaped bellows has a first radial segment and a second radial segment which are connected by an axial segment, and wherein the first radial segment of the ring-shaped bellows is positioned between the first radial segment of the retaining ring and an end face of the slide ring facing away from the counterring, and the second radial segment of the ring-shaped bellows is positioned between the second axial segment of the retaining ring and an inner segment of the housing, the counterring and a substantially L-shaped engaging ring being interconnected, the engaging ring being affixed to a shaft to be sealed, and the counterring and the engaging ring being sealed relatively to each other by a sealing ring, the counterring contacting a radial segment of the engaging ring and surrounding an axial segment with radial clearance, and the sealing ring being sealingly arranged, under elastic prestressing, in a gap formed by the clearance, wherein the counterring has an inner peripheral surface which forms an angle $\alpha$ of about 0.5° to about 60° with an axis of rotation, and wherein the radial clearance in which the sealing ring is arranged is greater on the side facing the radial segment of the engaging ring than on the side facing the slide ring.

2. A sealing device as defined in claim 1, wherein the angle $\alpha$ is from 5° to 45°.

3. A sealing device as defined in claim 1, wherein the counterring is contacted by a thrust ring arranged on the axial segment of the engaging ring, and the thrust ring is prestressed axially in the direction of the radial segment of the engaging ring.

4. A sealing device as defined in claim 1, wherein the counterring, the engaging ring, the sealing ring, and a thrust ring form a unit that can be preassembled.

5. A sealing device as defined in claim 1, wherein the engaging ring and a thrust ring are made of a tough, non-rusting material.

* * * * *